Dec. 29, 1931.  E. W. SMITH ET AL  1,839,167
APPARATUS FOR THE MANUFACTURE OF GAS
Filed Aug. 19, 1927
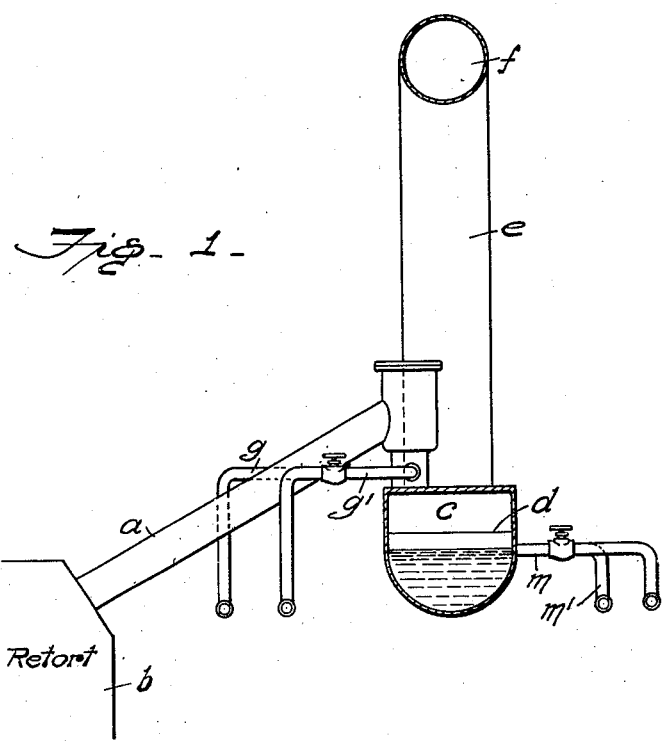
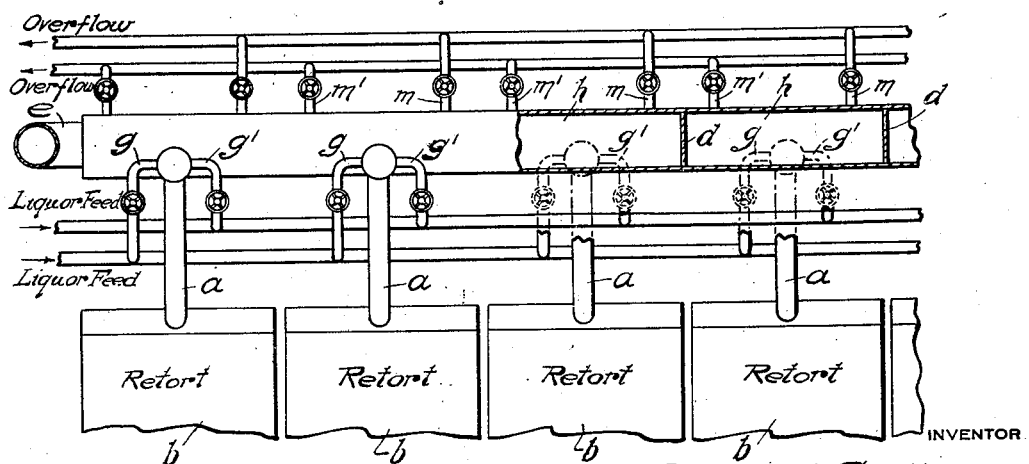

Patented Dec. 29, 1931

1,839,167

UNITED STATES PATENT OFFICE

ERNEST WOODHOUSE SMITH AND THOMAS CAMPBELL FINLAYSON, OF LONDON, ENGLAND

APPARATUS FOR THE MANUFACTURE OF GAS

Application filed August 19, 1927, Serial No. 214,150, and in Great Britain August 25, 1926.

In the specification of United States patent application Serial No. 110,688 we have described an improved manufacture of coal-gas, wherein one or more of a number of continuously-operated externally-heated vertical retorts are operated for the production of water-gas, while the remaining retort or retorts operate as in straight-gas-making conditions. The gas from the retorts operated for production of water-gas may be mixed with the gas from the retorts operated under straight-gas-making conditions, and tar may be admitted to a retort or retorts operated for the production of water-gas, at a zone suitable for cracking.

In view of the different constitutions of water-gas and straight-gas generated in continuously-operated, externally-heated vertical retorts as above described, and in view of variations in operating conditions which may be prevalent in retorts of similar design, but of different function, it may be desirable in some circumstances separately to treat these gases coming from a series of retorts before the gases finally leave the retort house.

The present invention accordingly provides a plant comprising a number of externally-heated, continuously, operated vertical retorts, wherein the gases from retorts operated under different conditions may be treated separately.

In one form of plant according to the invention, the seal-pot or gas-collecting main, which is normally common to a series of retorts, contains partitions forming compartments corresponding with each retort. If the water-gas is to be allowed to mix with the straight-gas, these partitions need be only of sufficient height to isolate the liquor in each compartment. Each compartment is preferably adapted to be connected by means of suitable valve-controlled pipes with one of two or more separate tar or liquor-circulating systems, according to the nature of the treatment required for the particular type of gas generated in the corresponding retort. When it is desired to treat separately the gas issuing from a particular retort, the off-take pipe or corresponding compartment of the collecting main or both the pipe and the compartment are fed with the appropriate liquid, which then passes out into the corresponding circulating system. The gas from each separate compartment may then mix with the gas from other retorts.

It will be understood that the invention provides means for dealing separately with the different gases alternatively generated in one retort when this mode of operation is adopted, and it is desirable to apply such separate treatment.

The accompanying diagrams illustrate the invention.

Fig. 1 shows one of a series of retorts connected to a collecting main common to a series of retorts.

Fig. 2 is a plan view of the construction shown in Fig. 1, the right-hand portion being shown partly in section and the parts omitted being indicated in broken lines.

The gas off-takes $a$ of the retorts $b$ discharge into the collecting main $c$ which is subdivided into compartments $h$ by transverse partitions $d$. The latter do not extend to the top of the main, so that while they serve to separate the liquor from the several retorts the gases from all the retorts collectively flow by pipe $e$ to the gas main $f$. The vertical portion of the off-take $a$ does not dip beneath the level of the liquor in the corresponding compartment of the collecting main; instead, the gas is treated by a spray of liquor discharged into the compartment by way of the pipe $g$ or the pipe $g'$. The liquor overflows from the compartment by way of a pipe $m$ or a pipe $m'$.

It will be seen that there are two sprays and two outlets, all controlled by valves, to each compartment. This is for the purpose of permitting liquor of the correct kind to be circulated accordingly as the retort corresponding with a given compartment is operated for making water-gas or straight-gas.

Having thus described the nature of the said invention and the best means we know of carrying the same into practical effect, we claim:—

1. In a gas-making plant comprising a plurality of retorts adapted for the production of any of a number of different gases, means for the liquid treatment and collection of the gases generated in the retorts comprising a substantially horizontal gas collecting main, partitions in the main extending upwardly from the bottom thereof and subdividing the main into a plurality of compartments each of which compartments is in communication in its upper portion with the adjacent compartments but is otherwise isolated therefrom, a gas-offtake pipe to each retort connecting the retort with the main, each gas-offtake pipe opening on to the main in a different compartment thereof, means for continuously introducing liquor into each compartment, said means comprising a spraying device to each compartment positioned in close proximity to the junction of the gas-offtake pipe opening thereonto and the main, and means for continuously withdrawing liquor from each compartment.

2. In a gas-making plant comprising a plurality of retorts adapted for the production of any of a number of different gases, means for the liquid treatment and collection of the gases generated in the retorts comprising a substantially horizontal gas collecting main, partitions in the main extending upwardly from the bottom thereof and subdividing the main into a plurality of compartments, each of which compartments is in communication in its upper portion with the adjacent compartments but otherwise isolated therefrom, a gas-offtake pipe to each retort connecting the retort with the main, each gas-offtake pipe opening on to the main in a different compartment thereof, means for continously introducing liquor into each compartment, said means comprising a plurality of spraying devices to each compartment positioned in close proximity to the junction of the gas-offtake pipe opening thereonto and the main, and a plurality of outlets to each compartment adapted for the continuous withdrawal of liquor therefrom.

In testimony whereof we have signed our names to this specification.

ERNEST WOODHOUSE SMITH.
THOMAS CAMPBELL FINLAYSON.